SYSTEM FOR SELECTIVELY REGISTERING THE OPERATING PERIODS OF A PLURALITY OF CONSUMING APPARATUS

Filed May 22, 1962 3 Sheets-Sheet 1

INVENTORS
HERMANN K.M. GROSSER
FRANZ J. SCHRAMEL
BY
Frank R. Jeifari
AGENT

INVENTOR
HERMANN K.M. GROSSER
FRANZ J. SCHRAMEL
BY
AGENT

INVENTOR
HERMANN K.M.GROSSER
FRANZ J. SCHRAMEL
BY
AGENT

United States Patent Office 3,161,761
Patented Dec. 15, 1964

3,161,761
SYSTEM FOR SELECTIVELY REGISTERING THE OPERATING PERIODS OF A PLURALITY OF CONSUMING APPARATUS

Hermann Karl Maria Grosser and Franz Josef Schramel, Hilversum, Netherlands, assignors to North American Philips Company, Inc., New York, N.Y., a corporation of Delaware Filed May 22, 1962, Ser. No. 197,817
Claims priority, application Netherlands May 31, 1961
9 Claims. (Cl. 235—92)

The invention relates to a system for registering the number of units of time that each of a number of consuming apparatus, or each of a number of groups (these apparatus to be considered as a unit), have been in operation. The invention is particularly of importance for the periodic recording of the indications of consumption meters of subscribers. Such recording involves fairly considerable costs, especially where the subscribers are distributed over a wide area. This involves the need for the automatic transmission of the consumption indicated by the meters by way of a telecommunication channel to an administration center, so that at the administration center the consumption of each subscriber can be recorded individually at any instant. The telecommunication channel is preferably a line already provided for other reasons. The information is preferably transmitted in digital form by means of alternating-current pulses, the frequency or frequencies of which are chosen so that these pulses do not disturb other information transmissions present on the line concerned. The system is preferably arranged so that, if necessary, each subscriber can be switched off, for example, in the event of non-payment.

If desired the whole system may be arranged so that the subscribers themselves, or at least those who wish to do so, can read the amount they owe to the supplier. A first requirement for the economic operation of such a system is that the individual apparatus of the subscribers should not be excessively expensive. This requirement applies, as a matter of course to a considerably smaller extent, to the central apparatus at the administration center, since this apparatus is common to all subscribers. The invention provides a solution to this problem, in which the individual apparatus of each subscriber is particularly simple in construction, and comprises only a small number of comparatively simple parts apart from parts already required for other purposes.

The invention is characterised in that:

(*a*) Each consuming apparatus is provided with an individual apparatus, which, together with a number of further individual apparatus is connected by way of a common telecommunication channel, to a central apparatus for processing and recording the information. The system is arranged so that the use of two or more groups of individual apparatus is possible, the apparatus of each group being connected by way of a telecommunication channel common to the group to the central apparatus;

(*b*) The central apparatus comprises a central clock with a cycle time T, which is equal to the duration of the time units to be charged to the subscriber's account for the use of their consuming apparatus. The central clock controls a starting signal generator, which produces, during each cycle of the central clock, *p* starting signals, where *p* is the number of common telecommunication channels. The central apparatus also includes switching means controlled by the clock and connecting the output of the starting signal generator in cyclic order of succession to one of the *p* common telecommunication channels, so that the instant, when a starting signal is produced all individual apparatus connected to the common telecommunication channel concerned simultaneously receive a starting signal;

(*c*) Each individual apparatus comprises a starting signal detector which, upon detection of a starting signal, starts an individual clock arranged in the individual apparatus concerned. This clock is in synchronism with the central clock and is constructed so that, after having started, it stops automatically after a time interval which is at least equal to $T/p$ and at most equal to T;

(*d*) Each individual apparatus comprises an announcing signal generator which is controlled not only by the individual clock of the individual apparatus but also by an adjusting switch of the consuming apparatus concerned. This generator produces, in the switched-on state of the consuming apparatus, an announcing signal at an instant of each cycle, individually allotted to the consuming apparatus, so that an instant of the cycles of the central clock is allotted to each consuming apparatus. The individual apparatus also comprises switching means which connect the output of the announcing signal generator to the common telecommunication channel, so that the announcing signals produced by the individual apparatus are transferred to the central apparatus;

(*e*) The central apparatus comprises an announcing signal detector which, upon detection of an announcing signal emitted by one of the individual apparatus, produces a number of counting pulses depending upon the rate to be applied. The central apparatus also comprises switching means controlled by the central clock. At each instant of the pulse cycles of the central clock, the switching means connect the output of the announcing signal detector to a counter individually allotted to the consuming apparatus to which the said instant is allotted.

The invention will be described more fully with reference to one embodiment thereof in which a television receiver is connected to a distribution net, but the invention is not restricted to this special application.

Figure 1:
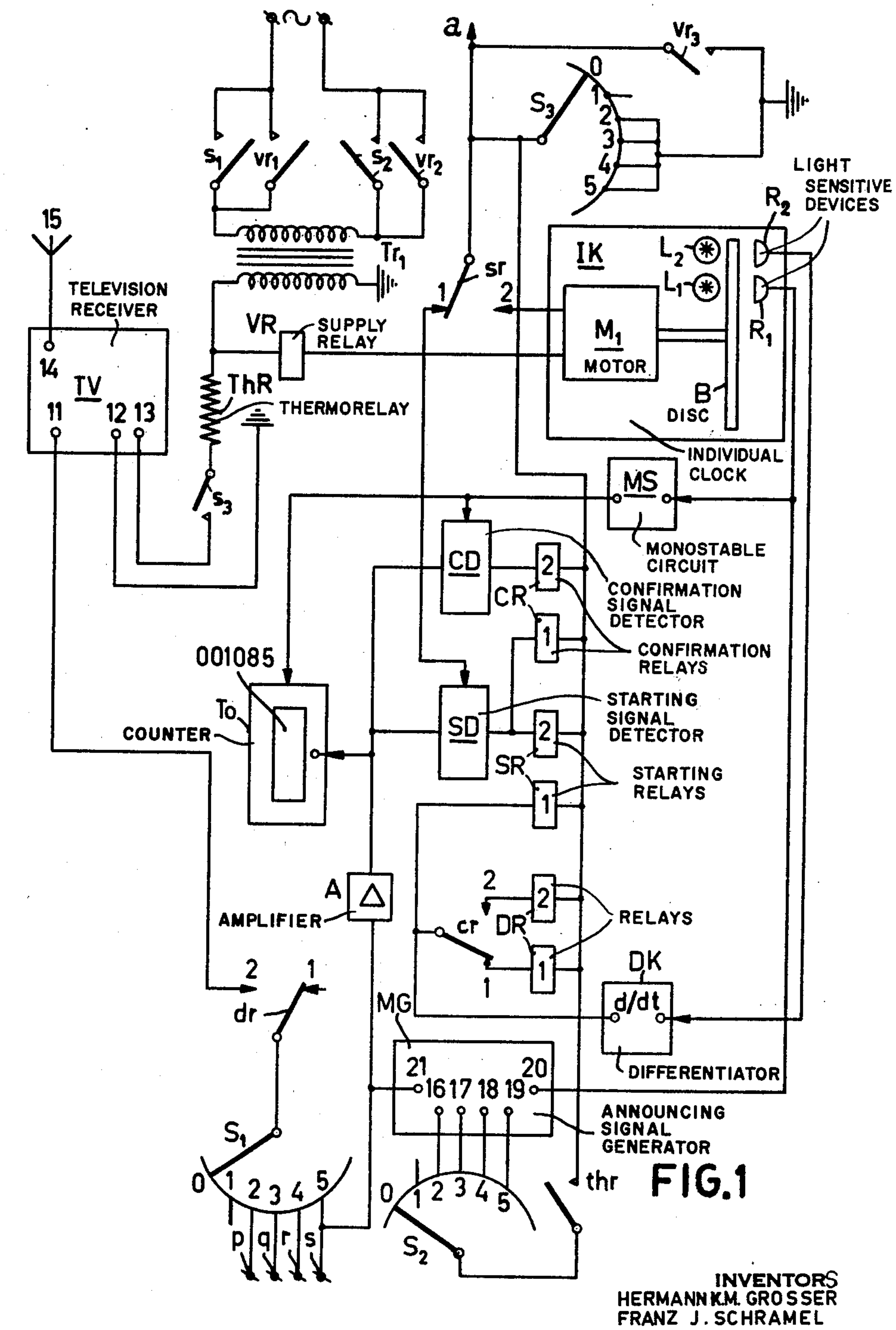
FIG. 1 shows a diagram of the individual apparatus.

Referring to FIG. 1, TV designates a television receiver having a terminal 11 for receiving the television signal supplied through a line, and two terminals 12 and 13 for supplying the supply voltage to the receiver. The terminal 12 must be grounded in the operational state of the television set. A terminal 14 intended for connection to an antenna 15 may also be provided. The television receiver receives its supply voltage from the secondary winding of a supply transformer $Tr_1$ by way of a thermo-relay T*h*R and a contact $s_3$ of an adjusting switch S. The primary winding of the supply transformer $Tr_1$ is connected to the electric power source by way of two further contacts $s_1$ and $s_2$ of the adjusting switch S in parallel to two contacts $vr_1$ and $vr_2$ respectively of a supply relay VR, so that the supply transformer receives the voltage from the electronic power source, when the contacts $s_1$ and $s_2$ are both closed or when the contacts $vr_1$ and $vr_2$ are both closed. The television signals are applied by way of four lines, which are connected separately to the terminals *p, q, r* and *s,* so that the subscriber may select any one of four different programs. The television signal is applied to the television receiver TV by way of the selector $S_1$ of the adjusting switch S and a contact *dr* of a switching-on relay DR. The adjusting switch S has six positions. Apart from the selector $S_1$ and the contacts $s_1$, $s_2$, and $s_3$, switch S has two further selectors $S_2$ and $S_3$. In the position the individual apparatus and the television set TV are switched off, since the contacts $s_1$, $s_2$ and $s_3$ are open. The supply transformer $Tr_1$ does not receive a voltage from the electric power source, since, as will be seen hereinafter, the supply relay VR is not energized and ıe contacts $vr_1$ and $vr_2$ are hence open. In the position the television receiver is ready for reception of signals om the antenna 15, connected to the terminal 14. In is position of the adjusting switch S, the contacts $s_1$, $s_2$ ıd $s_3$ are closed, so that the television receiver TV re- ;ives a supply voltage, but the individual apparatus does ɔt become operative. In each of the positions 2, 3, 4 ıd 5 of the adjusting switch S the television receiver :ceives the program applied to one of the terminals $p$, $q$, or $s$. The contacts $s_1$, $s_2$ and $s_3$ are also closed in these ositions. The six positions of the adjusting switch S are esignated for each of the three selectors $S_1$, $S_2$, $S_3$ by the igits 0, 1, 2, 3, 4 and 5.

The individual apparatus also comprises an individual lock IK, which is started in a manner to be described ereinafter and which supplies a pulse, subsequent to :arting, at an instant individually allotted to the sub- :riber concerned. The clock automatically stops after lapse of time which is no greater than the time units ɔ be charged to the consumer. In the embodiment shown ıe individual clock is a synchronous motor $M_1$, fed by ıe supply transformer $Tr_1$ and driving a disc B. Two ımps $L_1$ and $L_2$ are positioned on one side of this disc, nd on the other side of the disc, two light-sensitive re- eptors $R_1$ and $R_2$, for example two photoconductors, re aligned with the lamps $L_1$ and $L_2$ respectively. The ssembly is arranged so that, at the instant individually llotted to the subscriber, a hole in the disc appears be- ween the lamp $L_1$ and the receptor $R_1$, so that this recep- ɔr supplies a pulse at this instant. When the disc B has ırned slightly on, a hole in the disc appears between the ımp $L_2$ and the receptor $R_2$, so that the receptor $R_2$ then upplies a pulse. This pulse is used in a manner to be escribed hereinafter for stopping the motor.

Apart from the above-mentioned components the in- lividual apparatus also comprises an amplifier A, a start- ng signal detector SD, a confirmation signal detector CD, . starting relay SR, a confirmation relay CR, an announc- ng signal generator MG, a differentiating circuit DK, a nonostable circuit MS having a relaxation time of about 25 msec. and a counter $T_0$, responsive to pulses. These ıarts are arranged in the manner shown in FIG. 1 and nay all be of known construction, so that it is not neces- ary to describe these parts extensively. The relays DR, R and CR, particularly, are pulse-controlled relays hav- ng each two windings. These windings are indicated for ach of these relays by the numerals 1 and 2. If such relay receives a pulse via its winding 1, its change-over :ontact leaps to the position 1, provided this contact did ıot yet occupy this position, and the change-over contact emains in the position 1 after the pulse has disappeared. The winding 2 of each of these relays acts in the same nanner. The starting signal detector and the confirma- ion signal detector are merely filters adjusted to a given requency. At the reception of an alternating-current ɔulse of the frequency concerned they supply a pulse, at east if they are in the sensitive state, which is the case in his embodiment, when they are connected to ground. The counting circuit $T_0$ also comprises a filter tuned to ı given frequency, which is only sensitive, when connected o ground. The announcing signal generator MG is a unable oscillator having four adjusting terminals 16, 17, 18 and 19, an input terminal 20 and an output terminal 21, supplying, at the reception of a pulse from the receptor $R_1$, an alternating current pulse having a frequency which s determined by the terminal of the group of adjusting erminals 16, 17, 18 or 19 which is connected to ground ɔy way of selectors $S_2$ and $S_3$ of the adjusting switch S ınd the contact $thr$ of the thermorelay $ThR$. The delay ɔf the thermorelay $ThR$ is as far as possible equal to the ıeating-up time of the tube of the television receiver hav- ng the maximum heating-up time, so that the announc- ng signal generator cannot supply alternating-current ɔulses as long as the television receiver is not in the state ready for use. The light-sensitive receptors $R_1$ and $R_2$ may be light-sensitive resistors.

The arrangement operates as follows. Assume that initially all contacts and switches occupy the positions shown in FIG. 1 and that the subscriber concerned moves the adjusting switch S to the position 4 in order to receive the program 3. The first consequence is that the three contacts $s_1$, $s_2$, $s_3$, mechanically coupled with the adjusting switch S are closed. The supply transformer $Tr_1$ is thus connected to the electric power source and the television receiver TV obtains a supply voltage by way of the thermorelay $ThR$ and the contact $s_3$. At the same time the amplifier A, the differentiating circuit DK, the monostable circuit MS, the light-sensitive receptors $R_1$, $R_2$ and the lamps $L_1$ and $L_2$ are connected to ground in a manner not shown in the figure for the sake of simplicity by way of selector $S_3$ of the adjusting switch in the position 4 and the wire $a$. The starting signal detector SD is connected to ground by way of the change-over contact $sr$ in the position 1 and the selector $S_3$ of the adjusting switch S in the position 4, and the relay windings of the relays DR, SR and CR are grounded by way of the selector $S_3$ of the adjusting switch S in position 4. The result of these ground-connections is that the said parts of the individual apparatus all assume the state ready for use, particularly that the lamps $L_1$ and $L_2$ are ignited and the starting signal detector SD becomes sensitive for detecting a starting signal. The counting circuit $T_0$ and the confirmation signal detector CD, however, remain provisionally insensitive, since these members are only sensitive when the monostable circuit is in the transitional state. After the termination of the delay time of the thermo-relay $ThR$, which is, as stated above, as far as possible equal to the heating-up time of the tube having the maximum heating-up time of the television receiver, the contact $thr$ of the thermo-relay $ThR$ is closed and also the announcing signal generator MG is connected to ground by way of selector $S_2$ of the adjusting switch S in position 4, the contact $thr$ and the selector $S_3$ of the adjusting switch in position 4. Only from this instant onwards are both the television receiver TV and the individual apparatus completely ready for operation.

The reception of a starting signal is detected by the starting signal detector SD, which, upon the detection of such a signal, transmits a pulse through the winding 2 of the starting relay SR and the winding 1 of the confirmation relay CR. The change-over contact $sr$ thus assumes the position 2, but the change-over contact $cr$, which was in the position 1, remains in this position. The starting signal detector SD is thus separated from the ground connection and becomes therefore insensitive for detecting the starting signal. The motor $M_1$ of the individual clock IK then receives a supply voltage by way of the winding of the supply relay VR, the contact $sr$ in the position 2 and the selector $S_3$ of the adjusting switch S in position 4. The motor than starts running so that the disc B is turned. At the instant individually allotted to the subscriber concerned this disc arrives at a position in which a hole in the disc appears between the lamp $L_1$ and the receptor $R_1$. The monostable circuit MS and the oscillator of the announcing-signal generator MG thus receive a voltage, which results in that the monostable circuit MS changes over and the announcing-signal generator MG emits an alternating current pulse. After a given time, for example after 80 milliseconds, the monostable circuit returns to its stable state. The frequency of this alternating current pulse is determined by the position of the adjusting switch S. As long as the monostable circuit MS is in the transitional state, the confirmation detector CD is connected to ground, so that it is sensitive to the detection of a confirmation signal. The announcing signal is transferred by way of the wire, in this case termed the signal wire, connected to the terminal $s$, to the central apparatus. Normally central apparatus responds to the reception of the announcing signal by retransmitting the confirmation signal, which is detected by the confirmation detector CD, since the latter is still in the sensitive state. As soon as the confirmation detector detects the confirmation signal, it sends a pulse through the winding 2 of the confirmation relay CR. Thus the change-over contact *cr* assumes the position 2, but no further operations are carried out. After some time the disc B arrives at a position in which a hole in the disc appears between the lamp $L_2$ and the receptor $R_2$, so that the differentiating circuit DK receives a voltage which is converted into a pulse. Thus the relay winding 2 of the switching-on relay DR is energized via the change-over contact *cr* or in position 2. Moreover the relay-winding 1 of the starting relay SR is energized. The change-over contact *dr* thus changes over to the position 2 and the television receiver TV receives the program 3 via the selector $S_1$ of the adjusting switch S in position 4 and the change-over contact *dr* in position 2. The energizing circuit of the individual clock IK is interrupted at the change-over contact *sr*, and the starting detector SD is again rendered sensitive via the same contact. Consequently, the individual clock stops. After some time the starting detector SD again detects a starting signal, which initiates a new cycle. The new cycle differs from the cycle described above only in that the change-over contact *dr* of the switching-on relay DR remains in the position 2 and the television receiver TV continues receiving the program 3. If the subscriber moves the adjusting switch S back into the position 0, the contacts $s_1$, $s_2$ and $s_3$ are opened. The supply of the television receiver TV is interrupted at contact $s_3$, so that it is switched off. When the individual clock IK has not yet reached its final position at the instant when the adjusting switch S was moved into the position 0, the supply relay VR remains energized and the contacts $vr_1$ and $vr_2$ and $vr_3$ are closed. The transformer $Tr$ thus remains connected to the electric power supply and the individual clock IK remains energized until it reaches its final position, after which it stops in the manner described above. This results, however, in that the supply relay VR is deenergized and the contacts $vr_1$, $vr_2$ and $vr_3$ are opened. The individual apparatus is thus brought back into the rest position.

It can be easily ascertained that the television receiver is not switched to one of the four television programs, when the confirmation signal is not received. Consequently, a subscriber may be excluded from the reception of programs by arranging the central apparatus so that the retransmission of the confirmation signal to each subscriber can be individually suppressed.

The individual apparatus described above may, of course, also be adapted for a purpose differing from that described above. If, for example, a quantity of supplied energy is desired to be measured, the switch S may be connected to a measuring instrument which indicates the quantity of energy taken per unit time. It may in this case be necessary or desirable for the switch S to have more than six positions.

The individual apparatus may be provided with a counter $T_0$, which is rendered sensitive, simultaneously with the confirmation detector CD, by the monostable circuit. The central apparatus must then be arranged so that, immediately after the emission of a confirmation signal, it emits a number of pulses determined by the frequency of the announcing signal. These pulses are then detected and recorded by the counter $T_0$. The subscriber is thus enabled to read at any instant what amount he owes to the supplier of the television programs.

Since the confirmation detector and the counter are rendered sensitive only for a short period of time, they are prevented from responding to signals intended for the individual apparatus of the subscribers.

Figure 2:
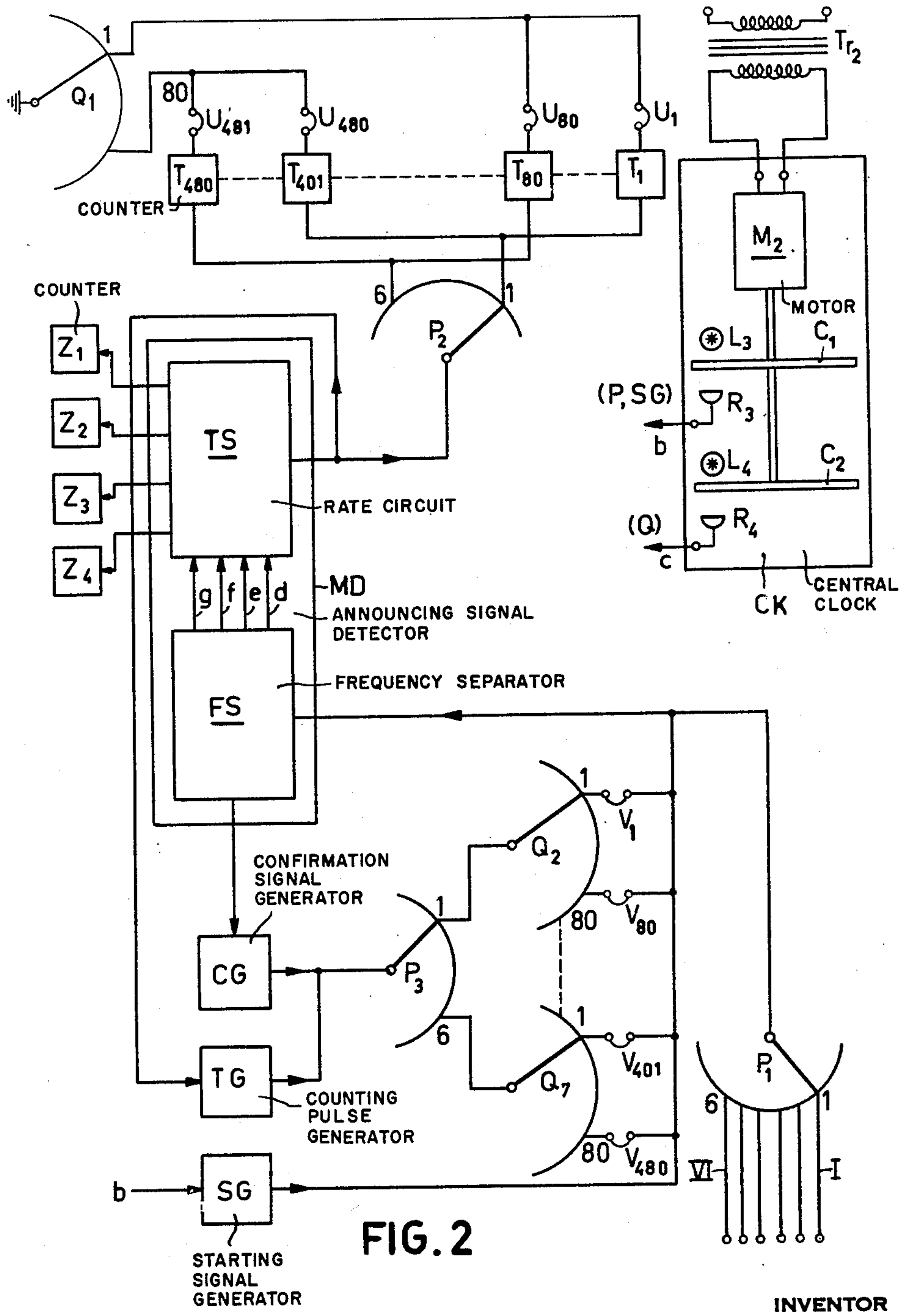
FIG. 2 shows a diagram of the central apparatus.

FIG. 2 shows the diagram of an electro-mechanical embodiment of the central apparatus. It is assumed here that the subscribers are organised in six groups of 80 subscribers each, so that 480 subscribers can be connected to this central apparatus. The 80 subscribers of the same group receive their programs by way of the same group of four wires. The signal wires of the six groups terminate at the bank contacts of the selector $P_1$ of a switch having three selectors $P_1$, $P_2$ and $P_3$ and six positions. In FIG. 2 these signal wires are designated by I, . . . VI. The central apparatus comprises furthermore a central clock CK which produces two pulse sequences, i.e. one sequence having six pulses a minute, supplied by the wire *b*, and a sequence having 480 pulses a minute, supplied by the wire *c*. The assembly is arranged so that between each pair of consecutive pulses of the sequence supplied by the wire *b*, 80 pulses of the sequence supplied by the wire *c* are produced. In the embodiment shown the central clock is formed by a synchronous motor $M_2$, which is energized by way of a supply transformer $Tr_2$ from the electric power source. The motor $M_2$ drives two perforated discs $C_1$ and $C_2$. On either side of each of these discs provision is made of a lamp $L_3$, $L_4$ respectively and a light-sensitive receptor $R_3$, and $R_4$ respectively, in opposite positions. The receptors may be, for example, light-sensitive resistors. The number of holes in the discs, their positions and the speed of revolution of the discs are chosen so that the receptors $R_3$ and $R_4$ supply pulse sequences having the desired, aforesaid properties. Owing to the coupling of the low power mains and high-power mains generally used nowadays an adequate synchronization is obtained between the central clock and the individual clocks, even if the latter are spread widely.

The central apparatus also comprises a second switch Q having seven selectors $Q_1$, $Q_2$, . . ., $Q_7$ and 80 positions. The switch P is controlled by the pulses supplied by the receptor $R_3$ and performs six steps a minute. The switch Q is governed by the pulses supplied by the receptor $R_4$ and thus performs 480 steps a minute. The central apparatus comprises finally 480 counters $T_1$, . . ., $T_{480}$, each of which is allotted individually to one of the 480 subscribers, an announcing signal detector MD, a starting signal generator SG, a conformation signal generator CG and accounting pulse generator TG. The announcing signal detector MD consists of a frequency separator FS and a rate circuit TS. The frequency separator FS comprises mainly four filters, each of which passes one of the four frequencies, which the announcing signal generators of the individual apparatus can produce. When the announcing signal detector MD receives an announcing signal, the frequency separator FS supplies a pulse to the rate circuit TS via one of the wires *d*, *e*, *f*, or *g*, in accordance with the frequency of the incoming announcing signal. The rate circuit converts each of these pulses into a predetermined number of counting pulses, for example each pulse incoming via the wire *d* into two counting pulses, each pulse coming in via the wire *e* into three counting pulses, each pulse coming in via the wire *f* into five counting pulses and each pulse coming in via the wire *g* into seven counting pulses. The rate circuit is preferably arranged so that these numbers may be varied.

The various component parts of the central apparatus are arranged in the manner illustrated in the figure and they may all of them be of known construction, so that a detailed description of these parts is not required.

The arrangement operates as follows. The switch P performs six steps a minute for the time the switch P remains in the same position, and the switch Q performs 80 steps for each step of the switch P. Immediately after the switch P has performed a step, the starting signal generator SG supplies a starting signal, which is fed by way of the selector $P_1$ of the switch P and the signal wire of the group indicated by this switch to the individual apparatus of all subscribers associated with this group, and starts the individual clocks thereof, as far as their receivers are adjusted to the reception by way of one of the four lines. The switch P and the starting signal generator SG receive, to this end, the pulses supplied the receptor $R_3$ via the wire , and the switch Q receives the pulses supplied by the ;ceptor $R_4$. For the sake of simplicity this is not illus-ated in the figure. When one of the individual ap-aratus, responding to the starting signal, retransmits an nnouncing signal, this is transferred by way of one of the our filters of the frequency separator FS by way of one f the four wires *d*, *e*, *f* or *g* to the rate circuit TS, which onverts the signal into a number of counting pulses. he number of counting pulses is determined, as stated bove, by the wire on which the rate circuit receives the gnal from the frequency separator FS. These counting ulses are conducted to ground by way of selector $P_2$ of e switch P (which is then adjusted to the group con-erned), the counter $T_1$ individually allotted to the sub-riber, a stop link $u_1$, also individually added to this sub-riber and the selector $Q_1$ of the switch Q (which is en adjusted to the subscriber concerned). The fre-uency separator, at the reception of an announcing signal, lso transmits, irrespective of the frequency of this signal, pulse to the confirmation signal generator CG, which us produces a confirmation signal. The confirmation gnal is fed by way of selector $P_3$ of the switch P, the elector $Q_2$, $Q_3$, $Q_4$, $Q_5$, $Q_6$ or $Q_7$ of the switch Q, indi-ated by the said switch, a stop $v_1$ individually allotted to e subscriber concerned by this switch, to the individual pparatus of the subscriber concerned. Moreover, the ounting pulses produced by the rate circuit are fed to the ounting pulse generator TG, which converts these pulses nto a form suitable for transmission and supplies them y way of the same path as the confirmation signal to the dividual apparatus concerned. If a given subscriber is be excluded, only the stop links $u_1$ and $v_1$ individually llotted to this subscriber need be removed. The sub-riber concerned can then no longer receive a confirma-on signal and the counter $T_1$ of this subscriber cannot ecord counting pulses. This subscriber then cannot re-eive counting pulses in return. Since the stop links $u_1$ nd $v_1$ must be inserted or withdrawn in common, it is esirable to unite them mechanically.

For administrative purposes it may be desirable to con-ect the rate circuit TS to four counters $Z_1$, $Z_2$, $Z_3$, $Z_4$ /hich indicate the common consumption of all sub-cribers, specified in accordance with the rates. Of course, hese four counters may be replaced by a single counter, which indicates the common consumption of all sub-cribers, without regard to rates. When using current echnique the pulses relating to subscribers whose stop inks $u_1$, the selector $P_1$ of the switch P and the signal wire f the group indicated and $v_1$ are removed are not count-d, since no current can flow in these circuits.

The synchronization of the central clock with the in-lividual clocks described above by the use of synchronous notors is very advantageous, since the individual appara-us may be economically fabricated. The synchroniza-ion may, of course, also be obtained by using synchro-izing pulses, but technically and economically this solu-ion is much less attractive. This latter technique may, owever, be employed, when synchronization by way of he electric power source is not possible.

The central apparatus may also employ electronic cir-uits. For example, the central clock CK may be re-laced by a counting circuit controlled by the power ource. The contacts of the arcs $P_1$ and $P_3$ of the switch P and of the selectors $Q_2$, . . . $Q_7$ of the switch Q may be eplaced in known manner by electronic gate circuits, which are controlled in the required manner by the clock pulses.

Figure 3:
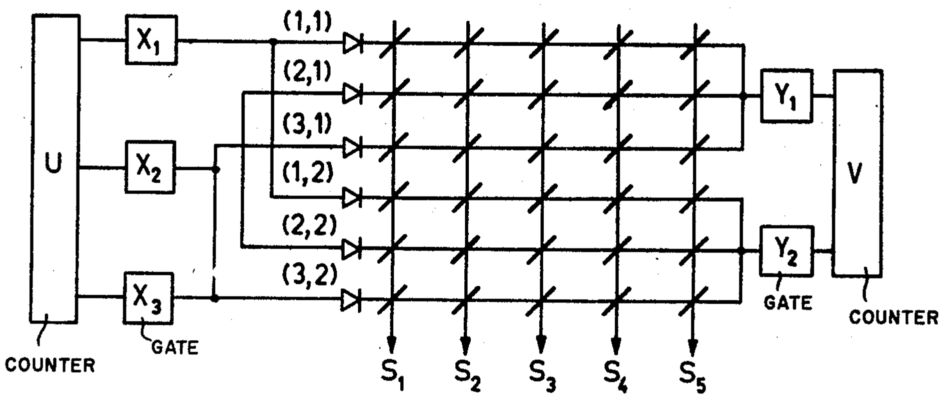
FIG. 3 is the circuit of a matrix storage which may be employed as a counter in the circuit of FIG. 2.

FIG. 3 illustrates a matrix storage control system, which can replace the counting circuits $T_1$–$T_{480}$ of FIG. 2. The storage elements of this matix are formed by ings of a material having a rectangular magnetic hys-eresis loop. These rings can be read and written in nown manner in coincidence. FIG. 3 shows more par-icularly the principle of reading, without coincidence, in cyclic order of succession of the information stored in the rows of the matrix. The matrix has six horizon-tal rows, which are designated, like the reading wires taken through them, by the numerals (1, 1), (2, 1), (3, 1), (1, 2), (2, 2), (3, 2). The matrix also has five vertical columns, through which are taken the five signal wires $S_1$, . . . $S_5$. The reading wire $(i, j)$ (wherein $i=1, 2, 3$; $j=1, 2$) is connected on the left-hand side to a gate $X_i$ and on the right-hand side to a gate $Y_j$. These gates are controlled by the counting circuits U and V, which in turn are controlled by the clock pulse generator (not shown). The outputs of each of these counting circuits supply pulses in a cyclic order of succession which open one of the gates $X_1$, $X_2$, $X_3$, or $Y_1$, $Y_2$ respectively. Thus the reading wires are energized in the order: (1, 1), (2, 2), (3, 1), (1, 2), (2, 1), (3, 2), (1, 1), (2, 2), (3, 1) . . . and the rows of the matrix storage are read in the same order. For decoupling purposes each read-ing wire must have a diode. It will furthermore be seen that the numbers of outputs of the counting circuits U and V must be mutually indivisible in order to avoid un-wanted, shorter periodicities.

Figure 4:
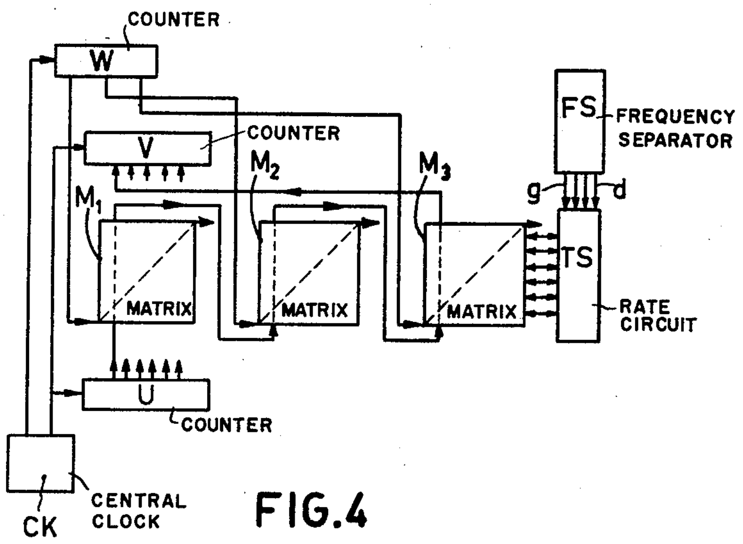
FIG. 4 is a block diagram illustrating a portion of the count of FIG. 2.

FIG. 4 illustrates how the system of FIG. 3 may be employed, with the use of coincidence means, for re-placing the components $Q_1$, $T_1$, . . . $T_{480}$, $P_2$ of the cen-tral apparatus of FIG. 2. The six groups of 80 counters each, which correspond individually to the individual ap-paratus connected to the common signal wire, are rep-resented in this diagram by matrices M (for the sake of simplicity FIG. 4 shows, instead of six, only three mat-rices). Each matrix comprises 80 rows, each of which corresponds to a counter $T_i$. These rows are read in the manner illustrated in FIG. 3 by means of two counting circuits U and W having 16 and 15 outputs respectively (in FIG. 4 these numbers are 6 and 5). In this case the reading wires of corresponding rows of all matrices are connected in series, so that, when the full reading cur-rent were passed through the reading wires, one row of all matrices would be simultaneously read. In reality, how-ever, half the reading current is passed through each read-ing wire. The other half of the reading current is supplied by a counting circuit W. Each output of the latter count-ing circuit is connected to a wire passed through all rings of one of the matrices. This output must therefore sup-ply half the reading current for the time allotted to the subscriber group concerned, since in this way first all rows of the matrix $M_1$ are read, subsequently those of the ma-trix $M_2$ and so on. The counting circuits U, V and W are controlled by the central clock CK. The writing of in-formation in a row of one of the matrices may be carried out by the same principle.

When a row of one of the matrices is read, the informa-tion stored therein is fed to the rate circuit TS, which receives information from the frequency separator FS about the number of units by which the registered amount is to be increased. The rate circuit is in this case an adder, and may be constructed in accordance with prin-ciples known from computer technique.

What is claimed is:

1. A system for registering in a central apparatus the number of units of time that each of a number of con-suming apparatus, or each of a number of groups of con-suming apparatus to be considered as a unit, have been in operation:

(*a*) each consuming apparatus comprising an individ-ual apparatus, means connecting said individual ap-paratus together with a number of further individual apparatus by way of a common telecommunication channel to said central apparatus for processing and recording information, said system comprising means permitting the use of more than one group of individ-ual apparatus, means connecting the apparatus of each group by way of a telecommunication channel common to the group to the central apparatus;

(*b*) said central apparatus comprising a central clock having a cycle time T, which is equal to the duration of said time units, to be charged to the subscribers account for the use of their consuming apparatus, a starting signal generator, said central clock comprising means for controlling said starting signal generator which produces, during each cycle of the central clock, $p$ starting signals, where $p$ is the number of common telecommunication channels, said central apparatus also comprising switching means controlled by said central clock for connecting the output of the starting signal generator separately in cyclic order of succession to one of the $p$ common telecommunication channels, so that at the instant when a starting signal is produced, all individual apparatus connected to a common telecommunication channel simultaneously receive a starting signal;

(*c*) each individual apparatus comprising an individual clock and a starting signal detector, said detector being connected to detect said starting signal, and in response thereto to start said individual clock in the individual apparatus concerned, means for synchronizing said individual clock with the central clock, said individual clock comprising means whereby after having started, the individual clock stops automatically after a time interval which is at least equal to $T/p$ and at the most equal to T;

(*d*) each individual apparatus comprising an adjusting switch and an announcing signal generator, means for controlling said announcing signal generator by the individual clock of the individual apparatus and by the adjusting switch of the consuming apparatus concerned, said announcing signal generator comprising means for producing in the switched-on state of the consuming apparatus, an announcing signal at an instant of each cycle individually allotted to the consuming apparatus, so that an instant of the cycles of the central clock is allotted individually to each consuming apparatus, said individual apparatus comprising switching means for connecting the output of the announcing signal generator to the common telecommunication channel, whereby the announcing signals produced by the individual apparatus are transferred to the central apparatus;

(*e*) said central apparatus comprising an announcing signal detector connected to detect an announcing signal emitted by an individual apparatus, and in response thereto to produce a number of counting pulses, depending upon the rate to be applied, the central apparatus also comprising switching means controlled by the central clock for connecting, at each instant of the pulse cycles of the central clock, the output of the announcing signal detector to a counter individually allotted to the consuming apparatus, to which the said instant is allotted.

2. A system as claimed in claim 1, wherein (*f*) the individual apparatus are connected so that the consuming sets are not brought into the operational state only by the adjustment of the adjusting switch;

(*g*) the central apparatus comprises a confirmation signal generator, connected to the announcing signal detector for producing a confirmation signal when the announcing signal detector has detected an announcing signal, said central apparatus also comprising switching means controlled by the central clock and which connect the output of the confirmation signal generator to the common conductor by way of which the announcing signal is received, which signal has brought about the confirmation signal concerned, whereby this confirmation signal is received by the individual apparatus which has transmitted the announcing signal concerned;

(*h*) the individual apparatus comprises a confirmation detector, means for controlling said confirmation detector by the individual clock of this apparatus so that it is only sensitive for detecting a confirmation signal for a time interval immediately after the time instant when an announcing signal is emitted, said time interval being sufficiently short that the confirmation detector is insensitive when the common conductor concerned can transmit a confirmation signal brought about by a further announcing signal, said confirmation detector comprising means for controlling switching means which are connected, upon the detection of a confirmation signal, to bring the consuming set into the operational state for a time interval which is at least equal to the cycle time T of the central clock.

3. A system as claimed in claim 1, in which the consuming sets can be brought into two or more operational states, wherein (*i*) the adjusting switch by means of which the consuming set can be moved into a desired operational position, comprises means for controlling the announcing signal generator of the individual apparatus concerned, and the announcing signal generator is connected so that it produces announcing signals, which contain, in addition, an information about the state of consumption of the consuming set;

(*j*) the announcing signal detector of the central apparatus is arranged so that upon detection of an announcing signal it analyzes the consumption state of the consuming set, to which the incoming announcing signal relates, and upon the detection and analysis of an announcing signal it produces a number of counting pulses depending upon this analysis.

4. A system as claimed in claim 3, wherein (*k*) the number of counting pulses produced by the announcing signal detector of the central apparatus, upon the detection and analysis of an announcing signal, is variable.

5. A system as claimed in claim 3, comprising a plurality of additional counters, wherein (*l*) the announcing signal detector of the central apparatus is connected to said additional counters for indicating the common consumption of all consuming sets.

6. A system as claimed in claim 3, wherein (*m*) the central apparatus comprises a counting pulse generator controlled by an announcing signal detector for producing, immediately after the detection and analysis of an announcing signal, a number of counting pulses depending upon the said analysis, said central apparatus also comprising switching means controlled by the central clock, said last-mentioned switching means connecting the output of the counting pulse generator to the common conductor by way of which the announcing signal is received which has brought about the counting pulses concerned, whereby these counting pulses are received by the individual apparatus which has transmitted the announcing signal concerned;

(*n*) each individual apparatus comprises a counter and a counting pulse detector connected to said counter and controlled by the individual clock of this apparatus so that it is only sensitive for detecting counting pulses for a time interval immediately after the instant when an announcing signal is transmitted, said time interval being sufficiently short that the counting pulse detector is insensitive at all times when the common conductor concerned can pass counting pulses brought about by a different announcing signal.

7. A system as claimed in claim 1, wherein the central clock and each of the individual clocks comprise a synchronous motor, and means for supplying said central clock and individual clocks from a common electric power source.

8. A system for registering in a central apparatus the number of units of time of predetermined length that each of a plurality of consuming apparatus of a group of said consuming apparatus have been in operation, said system comprising:

(a) a common telecommunication channel connecting said central apparatus to each said consuming apparatus of said group, (b) each said consuming apparatus comprising an individual apparatus, (c) means for connecting each individual apparatus to said common telecommunication channel, whereby information received by said central apparatus from said individual apparatus is processed and recorded in said central apparatus, (d) said central apparatus comprising a central clock, a starting signal generator, switching means, an announcing signal detector, and a plurality of counter means, (e) each said individual apparatus comprising an individual clock, a starting signal detector, an announcing signal generator, and an adjustable switch, (f) said central clock having a cycle time T equal to the duration of said time units, (g) means for synchronizing said individual clocks with said central clock, (h) means for controlling said starting signal generator by said central clock whereby during each said cycle said starting signal generates a starting signal, (i) means applying said starting signal to said common telecommunciation channel, (j) said starting signal detector comprising means responsive to said starting signal for starting the respective individual clock, (k) said individual clock comprising means for stopping automatically after a time interval no greater than T, (l) means controlling said announcing signal generators by the respective individual clock and adjusting switch, whereby said announcing signal generator generates an announcing signal at an instant of said cycle individually allotted to the respective consuming apparatus, (m) means applying said announcing signal to said announcing signal detector by way of said common channel, (n) said announcing signal generator comprising means for detecting said announcing signal to produce counting pulses, (o) means applying said counting pulses by way of said switching means to said counters, (p) and means controlling said switching means by said central clock, whereby said counting pulses are applied to one of said counters individually allotted to the respective consuming apparatus.

9. A system for registering, in a central apparatus, the number of units of time of predetermined length that each consuming apparatus of a plurality of groups of a plurality of consuming apparatus each have been in operation, said system comprising:

(a) a plurality of telecommunication channels connected to said central apparatus, with a separate common telecommunication channel for all the consuming apparatus of each said group.

(b) each said consuming apparatus comprising an individual apparatus, (c) means for connecting each individual apparatus to the respective common telecommunication channel, whereby information received by said central apparatus from said individual apparatus is processed and recorded in said central apparatus, (d) said central apparatus comprising a central clock, a starting signal generator, first and second switching means, an announcing signal detector, and a plurality of counters, (e) each of said individual apparatus comprising an individual clock, a starting signal detector, an announcing signal generator, an adjustable switch, and third switching means, (f) said central clock having a cycle time T equal to the duration of said time units, (g) means for synchronizing said individual clocks with said central clock, (h) means for controlling said starting signal generator by said central clock, whereby during each said cycle said starting signal generates $p$ starting signals, wherein $p$ is the number of telecommunication channels, (i) means controlling said first switching means by said central clock for separately applying said starting signals in cyclic order of succession to said telecommunication channels, whereby each individual apparatus connected to a common line receives a starting signal at the same time, (j) said starting signal detector comprising means responsive to said starting signal for starting the respective individual clock, (k) said individual clock comprising means for automatically stopping after a time interval at least equal to $T/p$ but no greater than T.

(l) means controlling said announcing signal generators by the respective individual clock and adjusting switch, whereby said announcing signal generator generates an announcing signal at an instant of said cycle individually allotted to the respective consuming apparatus, (m) said third switching means being connected to apply said announcing signal to said announcing signal detector by way of the respective common telecommunication channel, (n) said announcing signal generator comprising means for detecting said announcing signal to produce counting pulses, (o) means applying said counting pulses by way of said second switching means to said counters, (p) and means controlling said second switching means by said central clock, whereby said counting pulses are applied to the one of said counters individually allotted to the respective consuming apparatus.

References Cited in the file of this patent

UNITED STATES PATENTS

| | | |
|---|---|---|
| 1,157,625 | Heuser | Oct. 19, 1915 |
| 2,207,715 | Bumstead | July 16, 1940 |
| 2,207,743 | Larson et al. | July 16, 1940 |
| 2,755,161 | Rahmel | July 17, 1956 |